US012420576B2

(12) United States Patent
Higashi et al.

(10) Patent No.: US 12,420,576 B2
(45) Date of Patent: Sep. 23, 2025

(54) AUXILIARY TAPE CASSETTE INCLUDING ROTATION TRANSMISSION MEMBER, AUXILIARY TAPE, AND CASE ACCOMMODATING AT LEAST PART OF ROTATION TRANSMISSION MEMBER AND AT LEAST PART OF AUXILIARY TAPE

(71) Applicant: BROTHER KOGYO KABUSHIKI KAISHA, Nagoya (JP)

(72) Inventors: Kosuke Higashi, Nagoya (JP); Kentaro Murayama, Kasugai (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 0 days.

(21) Appl. No.: 18/356,508

(22) Filed: Jul. 21, 2023

(65) Prior Publication Data

US 2023/0356537 A1 Nov. 9, 2023

Related U.S. Application Data

(63) Continuation of application No. PCT/JP2022/002144, filed on Jan. 21, 2022.

(30) Foreign Application Priority Data

Jan. 29, 2021 (JP) ................................ 2021-013361

(51) Int. Cl.
*B41J 32/00* (2006.01)
*B41J 17/32* (2006.01)

(52) U.S. Cl.
CPC .................................... *B41J 32/00* (2013.01)

(58) Field of Classification Search
None
See application file for complete search history.

(56) References Cited

U.S. PATENT DOCUMENTS 3,672,603 A 6/1972 Swain
3,804,227 A 4/1974 Cappotto et al.
(Continued)

FOREIGN PATENT DOCUMENTS

CN 102092201 A 6/2011
CN 103273748 A 9/2013
(Continued)

OTHER PUBLICATIONS

JP 06-115234 A (including English language abstract) to Yamazaki, publication date Apr. 26, 1994. (Year: 1994).*
(Continued)

*Primary Examiner* — Leslie J Evanisko
(74) *Attorney, Agent, or Firm* — KENEALY VAIDYA LLP

(57) ABSTRACT

An auxiliary tape cassette is attachable to a printing device body together with a printing tape cassette. The printing tape cassette includes a printing tape and a printing-tape-cassette rotation transmission member. The auxiliary tape cassette includes an auxiliary tape, an auxiliary-tape-cassette rotation transmission member, and a case. The auxiliary tape is used for printing on the printing tape. The auxiliary-tape-cassette rotation transmission member is connectable to the printing-tape-cassette rotation transmission member of the printing tape cassette. The case accommodates therein at least a part of the auxiliary-tape-cassette rotation transmission member and at least a part of the auxiliary tape.

12 Claims, 10 Drawing Sheets

(56) References Cited

U.S. PATENT DOCUMENTS

| | | | |
|---|---|---|---|
| 3,823,808 | A | 7/1974 | Murata et al. |
| 3,948,382 | A | 4/1976 | Nesbitt et al. |
| 4,034,935 | A | 7/1977 | Plaza et al. |
| 4,252,450 | A | 2/1981 | Goodman et al. |
| 4,351,619 | A | 9/1982 | Duke et al. |
| 4,397,574 | A | 8/1983 | Wojdyla |
| 4,402,619 | A | 9/1983 | Paque et al. |
| 4,490,059 | A | 12/1984 | Daughters |
| 4,499,513 | A | 2/1985 | Umeda |
| 4,538,931 | A | 9/1985 | Nagashima |
| 4,565,128 | A | 1/1986 | Moriyama et al. |
| 4,598,780 | A | 7/1986 | Iwasaki et al. |
| 4,668,961 | A | 5/1987 | Hiramatsu |
| 4,832,514 | A | 5/1989 | Basile |
| 4,856,921 | A | 8/1989 | Hatakeyama |
| 5,099,378 | A | 3/1992 | Turgeon |
| 5,145,268 | A | 9/1992 | Cavallini |
| 5,325,114 | A | 6/1994 | Fogle et al. |
| 5,402,954 | A | 4/1995 | Skavnak et al. |
| 5,435,657 | A | 7/1995 | Pearce et al. |
| 5,472,286 | A | 12/1995 | Uemura et al. |
| 5,605,087 | A | 2/1997 | Beadman |
| 5,619,244 | A | 4/1997 | Manna |
| 5,645,360 | A | 7/1997 | Iwane et al. |
| 5,695,705 | A | 12/1997 | Halket et al. |
| 5,843,270 | A | 12/1998 | Buergin |
| 5,917,532 | A | 6/1999 | Cornell et al. |
| 5,959,652 | A | 9/1999 | Privin |
| 6,511,238 | B1 | 1/2003 | Glize |
| 2007/0172286 | A1 | 7/2007 | Pomfret |
| 2008/0084494 | A1 | 4/2008 | Pomfret |
| 2010/0247208 | A1 | 9/2010 | Yamaguchi et al. |
| 2010/0247212 | A1 | 9/2010 | Yamaguchi et al. |
| 2015/0283836 | A1 | 10/2015 | Sakano et al. |
| 2016/0368275 | A1 | 12/2016 | Sakano et al. |
| 2017/0190195 | A1 | 7/2017 | Kosuge et al. |
| 2022/0219468 | A1 | 7/2022 | Murayama |

FOREIGN PATENT DOCUMENTS

| | | | |
|---|---|---|---|
| CN | 106132712 | A | 11/2016 |
| CN | 107073982 | A | 8/2017 |
| CN | 107856424 | A | 3/2018 |
| CN | 107878049 | A | 4/2018 |
| EP | 0414544 | A2 | 2/1991 |
| EP | 4023452 | A1 | 7/2022 |
| GB | 2016411 | A | 9/1979 |
| JP | S50-36734 | B1 | 11/1975 |
| JP | S54-111914 | A | 9/1979 |
| JP | S59-6460 | A | 1/1984 |
| JP | S59-95180 | A | 6/1984 |
| JP | S60-8072 | U | 1/1985 |
| JP | S60-9657 | U | 1/1985 |
| JP | S60-36255 | U | 3/1985 |
| JP | S60-46254 | U | 4/1985 |
| JP | S60-48456 | U | 4/1985 |
| JP | S60-188821 | A | 9/1985 |
| JP | S60-224571 | A | 11/1985 |
| JP | S61-154877 | A | 7/1986 |
| JP | S62-103179 | A | 5/1987 |
| JP | S63-156762 | U | 10/1988 |
| JP | H02-6173 | A | 1/1990 |
| JP | H02-9562 | U | 1/1990 |
| JP | H02-11379 | A | 1/1990 |
| JP | H02-11380 | A | 1/1990 |
| JP | H02-37568 | Y | 10/1990 |
| JP | H03-97181 | A | 4/1991 |
| JP | H03-284973 | A | 12/1991 |
| JP | H04-152176 | A | 5/1992 |
| JP | H05-41834 | U | 6/1993 |
| JP | H05-53956 | U | 7/1993 |
| JP | H07-001254 | A | 1/1995 |
| JP | H07-9745 | A | 1/1995 |
| JP | H07-32710 | A | 2/1995 |
| JP | H07-276755 | A | 10/1995 |
| JP | H07-276757 | A | 10/1995 |
| JP | H08-183204 | A | 7/1996 |
| JP | H08-183232 | A | 7/1996 |
| JP | 2000-103149 | A | 4/2000 |
| JP | 2001-047713 | A | 2/2001 |
| JP | 2002-211092 | A | 7/2002 |
| JP | 2003-276290 | A | 9/2003 |
| JP | 2007-502221 | A | 2/2007 |
| JP | 2008-261968 | A | 10/2008 |
| JP | 2009-196804 | A | 9/2009 |
| JP | 2010-234772 | A | 10/2010 |
| JP | 2011-148167 | A | 8/2011 |
| JP | 2011-150007 | A | 8/2011 |
| JP | 2014-170142 | A | 9/2014 |
| WO | 2005/018944 | A1 | 3/2005 |
| WO | 2020203180 | A1 | 10/2020 |
| WO | 2021065465 | A1 | 4/2021 |

OTHER PUBLICATIONS

International Preliminary Report on Patentability for PCT/JP2022/002144 (Jul. 31, 2023).
International Search Report of the International Searching Authority for PCT/JP2022/002144 (Mar. 1, 2022).
Extended European Search Report for corresponding European Patent Application No. 22745738.9 dated Oct. 22, 2024.

* cited by examiner

AUXILIARY TAPE CASSETTE INCLUDING ROTATION TRANSMISSION MEMBER, AUXILIARY TAPE, AND CASE ACCOMMODATING AT LEAST PART OF ROTATION TRANSMISSION MEMBER AND AT LEAST PART OF AUXILIARY TAPE

REFERENCE TO RELATED APPLICATIONS

This is a by-pass continuation application of International Application No. PCT/JP2022/002144 filed Jan. 21, 2022 claiming priority from Japanese Patent Application No. 2021-013361 filed Jan. 29, 2021. The entire contents of the International Application and the priority application are incorporated herein by reference.

BACKGROUND ART

In a conventional printing device configured to perform printing on a printing tape, a cassette accommodating the printing tape and an ink ribbon therein is attached to and detached from the main body of the printing device for an exchange and supply of the printing tape and the ink ribbon. In such a cassette, the printing tape and the ink ribbon are accommodated in a single casing.

DESCRIPTION

According to the above-described cassette, since the ink ribbon (i.e., an auxiliary tape) and the printing tape are provided as a set, the available combinations of color of ink and type of printing tape (for example, color, size, and material of the printing tape) are limited, depending on the type of the cassette that has been prepared.

In view of the foregoing, it is an object of the present disclosure to provide an auxiliary tape cassette enabling an auxiliary tape and a printing tape to be arbitrarily combined together.

In order to attain the above and other objects, according to one aspect, the present disclosure provides an auxiliary tape cassette attachable to a printing device body together with a printing tape cassette. The printing tape cassette includes a printing tape and a printing-tape-cassette rotation transmission member. The auxiliary tape cassette includes an auxiliary tape, an auxiliary-tape-cassette rotation transmission member, and a case. The auxiliary tape is used for printing on the printing tape. The auxiliary-tape-cassette rotation transmission member is connectable to the printing-tape-cassette rotation transmission member of the printing tape cassette. The case accommodates therein at least a part of the auxiliary-tape-cassette rotation transmission member and at least a part of the auxiliary tape.

According to another aspect, the present disclosure provides a printing tape cassette attachable to a printing device body together with an auxiliary tape cassette. The auxiliary tape cassette includes an auxiliary tape and an auxiliary-tape-cassette rotation transmission member. The auxiliary tape is used for printing on a printing tape. The printing tape cassette includes the printing tape, a printing-tape-cassette rotation transmission member, and a case. The printing-tape-cassette rotation transmission member is connectable to the auxiliary-tape-cassette rotation transmission member of the auxiliary tape cassette. The case accommodates therein at least a part of the printing-tape-cassette rotation transmission member and at least a part of the printing tape.

According to still another aspect, the present disclosure provides a printing cassette includes a printing tape cassette, an auxiliary tape cassette, a rotation transmission member for connection, and a rotation transmission member for being connected. The printing tape cassette includes a printing tape. The auxiliary tape cassette is attachable to a printing device body together with the printing tape cassette. The printing tape cassette includes a first case. The first case accommodates therein at least a part of the printing tape. The auxiliary tape cassette includes an auxiliary tape and a second case. The auxiliary tape is used for printing on the printing tape. The second case accommodates therein at least a part of the auxiliary tape. At least a part of the rotation transmission member for connection is accommodated in at least one of the first case and the second case. The rotation transmission member for connection is connectable to the rotation transmission member for being connected.

With the above configurations, arbitrary combinations of the auxiliary tape and the printing tape can be obtained by respectively selecting the auxiliary tape cassette and the printing tape cassette.

Figure 3:
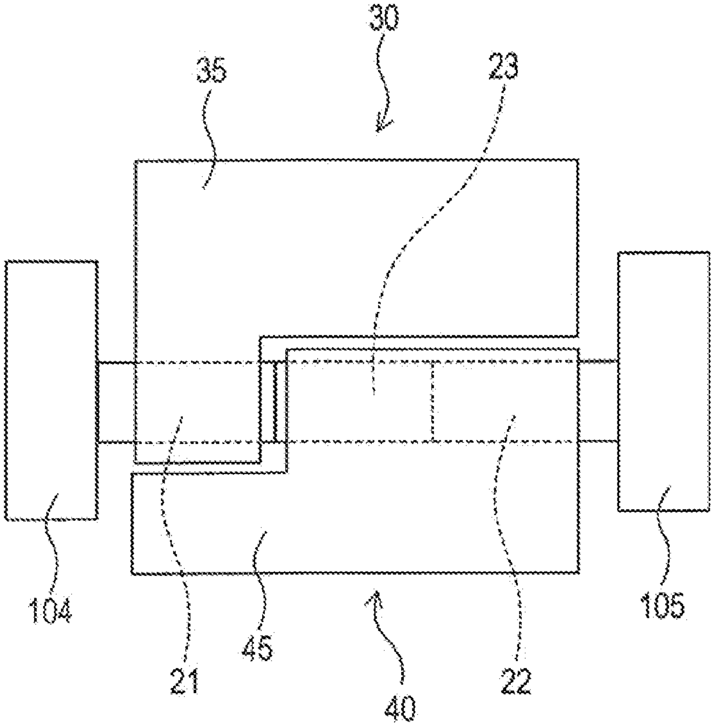
FIG. 3 is a schematic diagram of a transmission mechanism in the printing cassette of FIG. 2A.
Figures 6A, 6B, 6C:
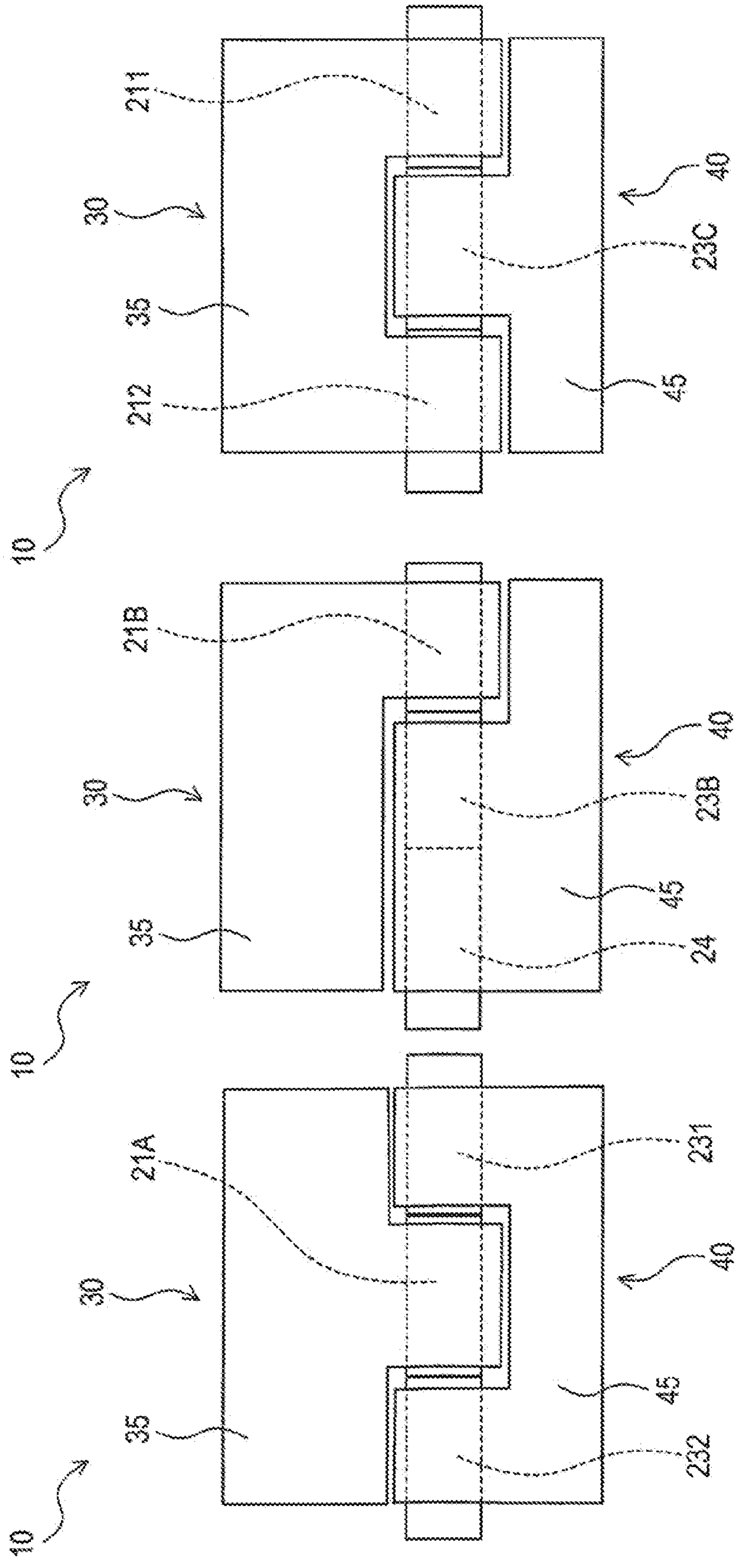

FIGS. 6A, 6B, and 6C are each a schematic diagram of a transmission mechanism in a printing cassette different from FIG. 3.

Figure 7B:
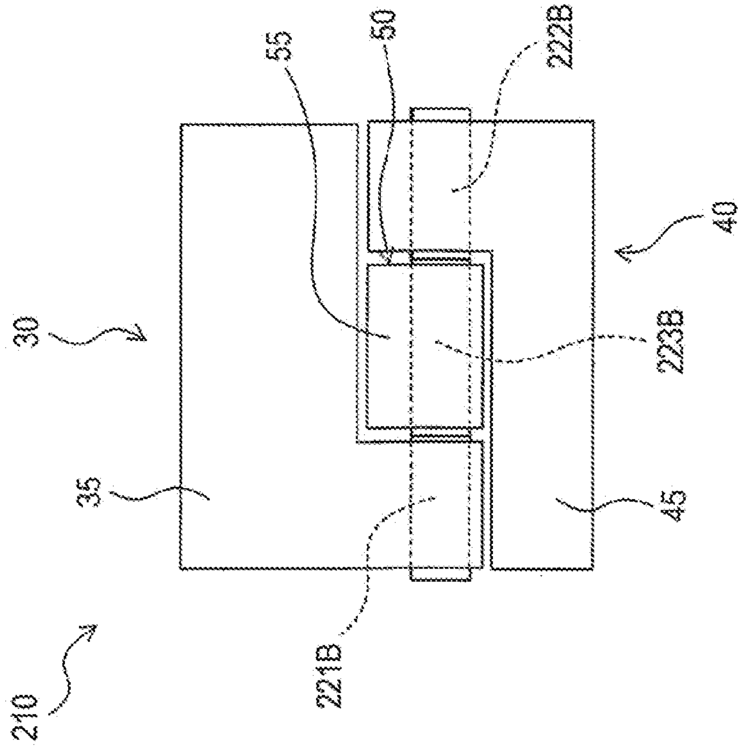
Figure 7A:
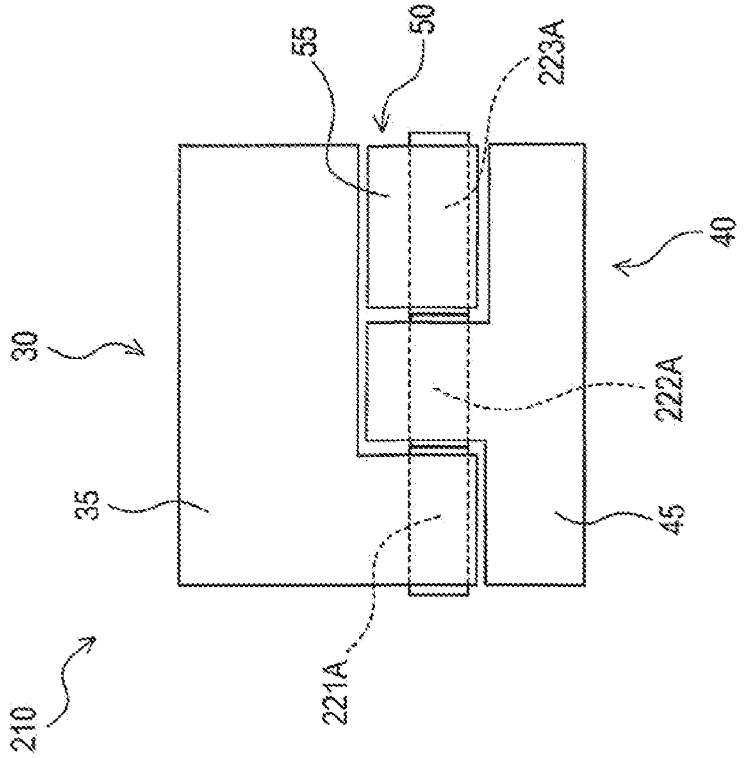

FIGS. 7A and 7B are each a schematic diagram of a transmission mechanism in a printing cassette different from FIG. 3.

Figure 8B:
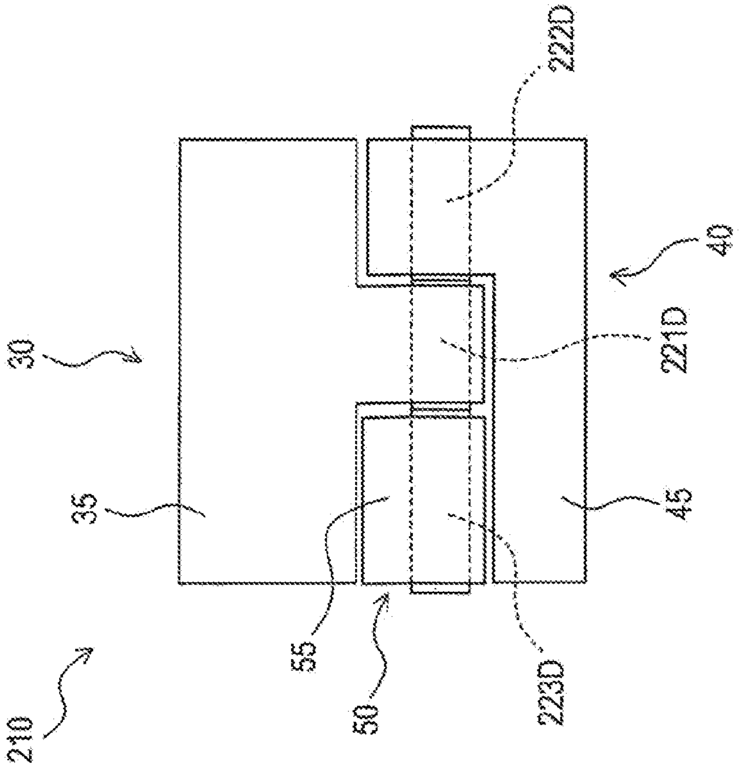
Figure 8A:
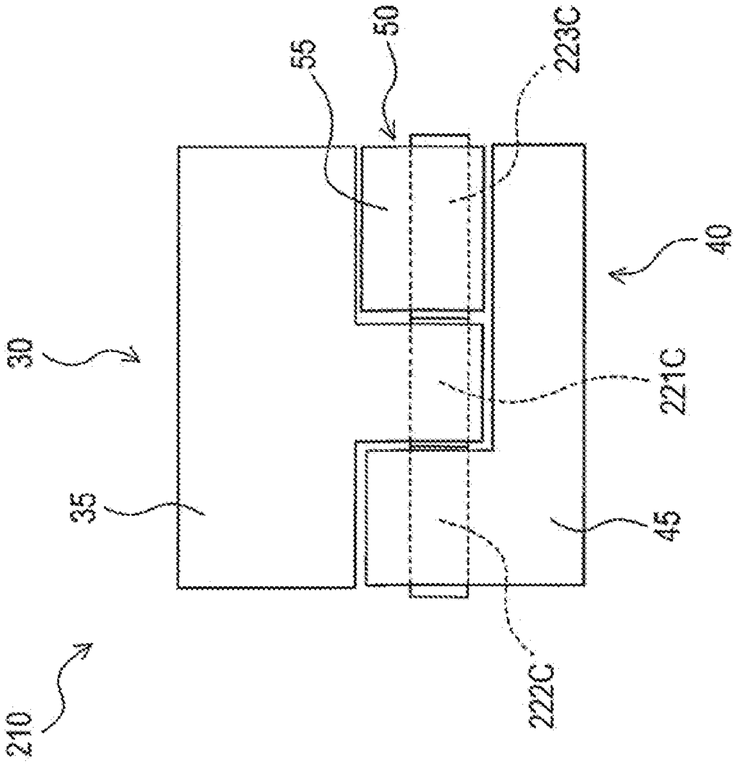

FIGS. 8A and 8B are each a schematic diagram of a transmission mechanism in a printing cassette different from FIG. 3.

Figure 9B:
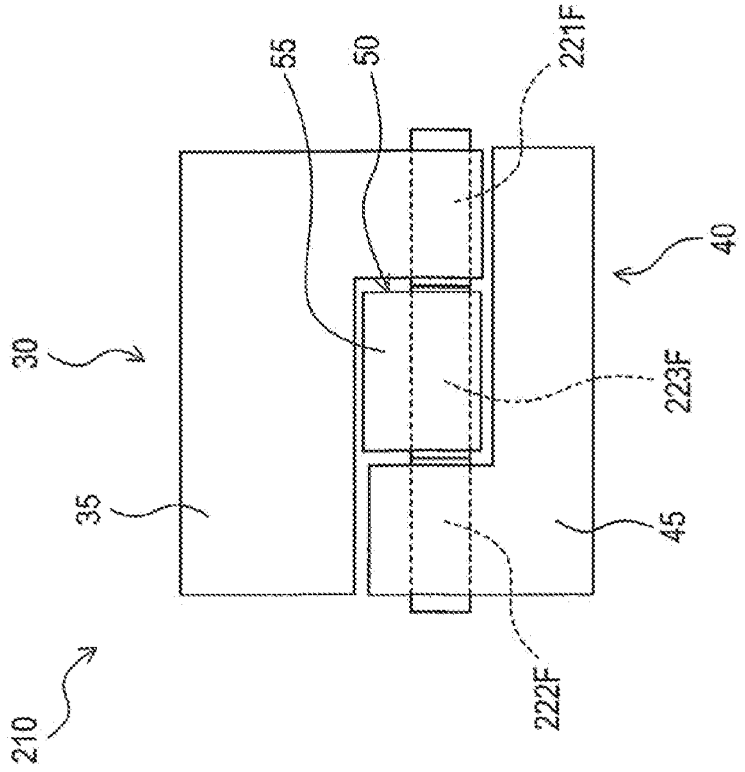
Figure 9A:
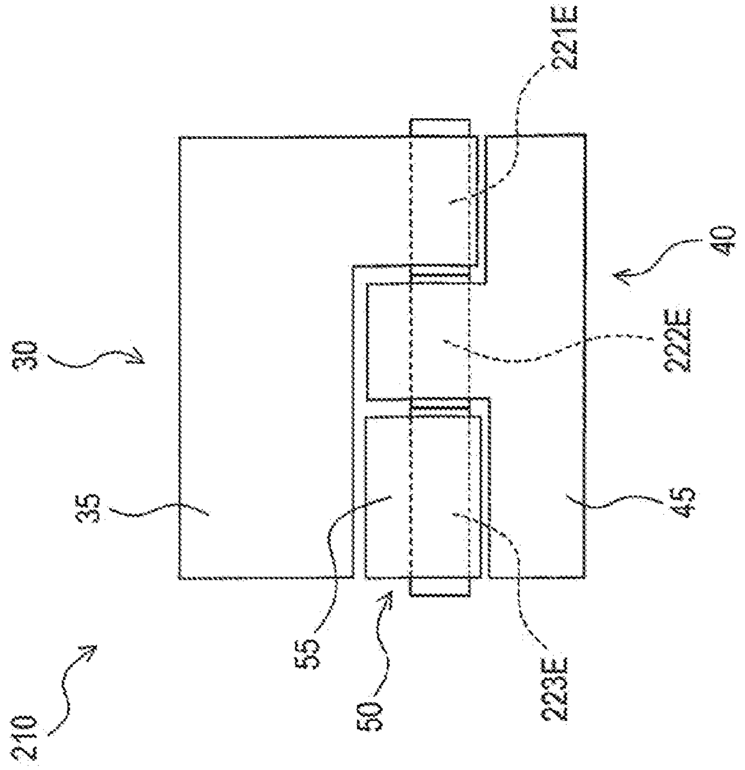

FIGS. 9A and 9B are each a schematic diagram of a transmission mechanism in a printing cassette different from FIG. 3.

FIGS. 10A, 10B, 10C, and 10D are each a schematic diagram of a transmission mechanism in a printing cassette different from FIG. 3.

1. FIRST EMBODIMENT

1-1. Structure

Figure 1:
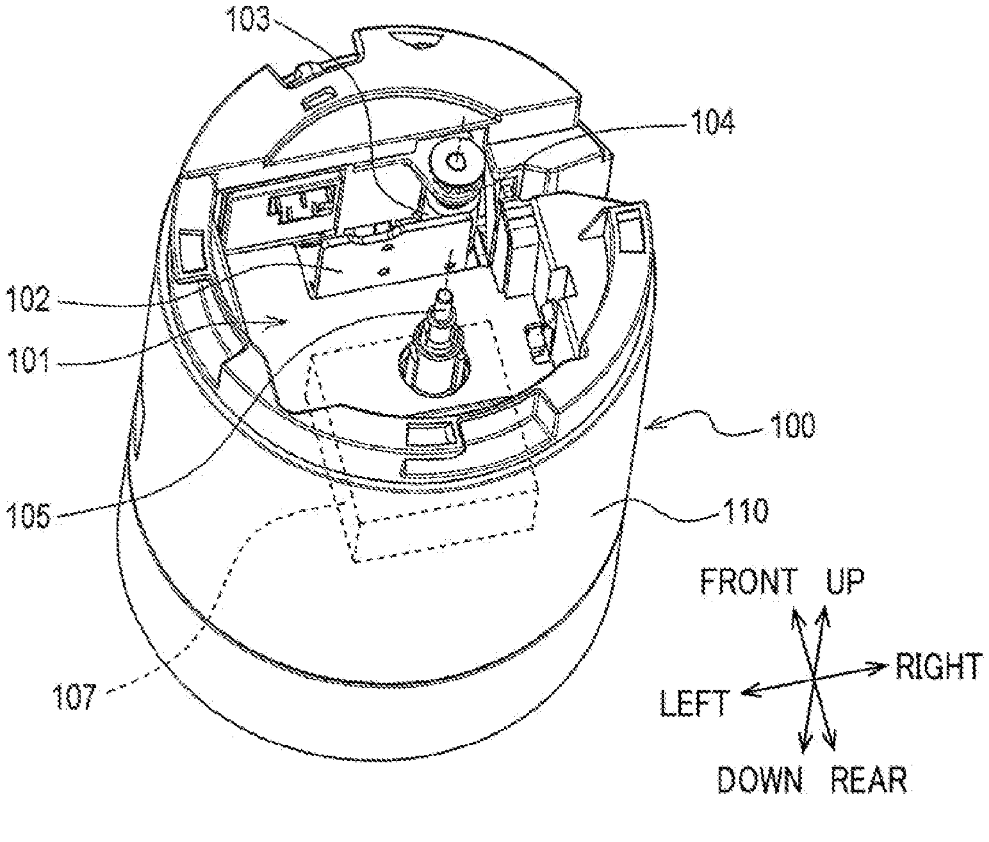
FIG. 1 is a schematic perspective view illustrating a printing device body.
Figure 2A:
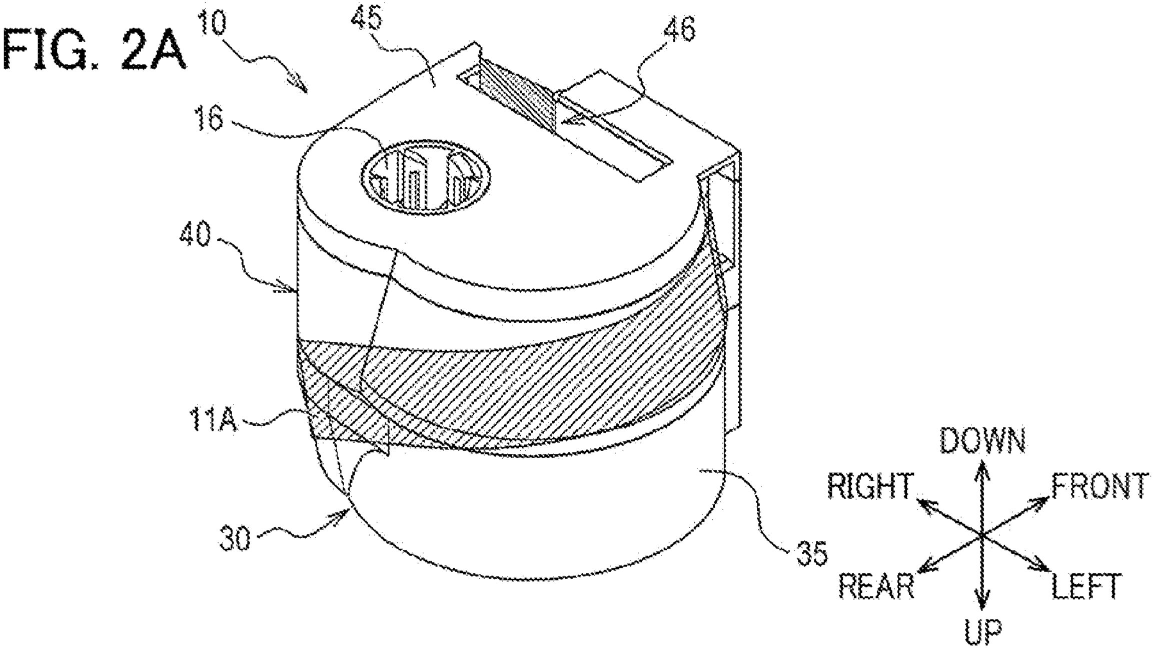
FIG. 2A is a schematic perspective view of a printing cassette.

A printing device is configured of a printing device body 100 illustrated in FIG. 1 and a printing cassette 10 illustrated in FIG. 2A. The printing device performs printing on a strip of printing tape.

According to the present embodiment, a connecting direction between a printing tape cassette 30 and an auxiliary tape cassette 40 will be called the up-down direction, a direction perpendicular to the up-down direction in which a printing tape 11A is conveyed at a head opening 46 will be called the left-right direction, and a direction perpendicular to both the up-down direction and the left-right direction will be called the front-rear direction.

<Printing Device Body>

As illustrated in FIG. 1, the printing device body 100 includes a cassette accommodating portion 101, a printing head 102, a platen roller 103, a platen gear 104, a drive shaft 105, a driving source 107, and a housing 110.

(Cassette Accommodating Portion)

The cassette accommodating portion 101 is a recessed portion to which the printing cassette 10 is attachable. The cassette accommodating portion 101 has a function of fixing a position of the printing cassette 10. The cassette accommodating portion 101 is provided in the housing 110.

(Printing Head)

The printing head 102 is positioned inside the cassette accommodating portion 101. The printing head 102 includes a plurality of heating elements whose heating is individually controlled.

(Platen Roller)

The platen roller 103 is positioned inside the cassette accommodating portion 101 and adjacent to the printing head 102 so as to face the printing head 102. The platen roller 103 is pivotally movable toward and away from the printing head 102. The platen roller 103 has a rotation axis that is parallel to the up-down direction.

(Platen Gear)

The platen gear 104 is connected to the platen roller 103. In the present embodiment, the rotation axis of the platen gear 104 and the rotation axis of the platen roller 103 are arranged on the same line. The platen gear 104 is pivotally movable together with the platen roller 103.

(Drive Shaft)

The drive shaft 105 is connectable to both a take-up spool 16 and an input gear 22 of the printing cassette 10. The drive shaft 105 rotates the take-up spool 16 and the input gear 22.

The drive shaft 105 is positioned inside the cassette accommodating portion 101. The drive shaft 105 has a rotation axis that is parallel to the up-down direction. The drive shaft 105 is rotated about the rotation axis by the driving source 107.

(Driving Source)

The driving source 107 drivingly rotates the drive shaft 105. For example, a mechanism including a motor and a gear is available as the driving source 107.

<Printing Cassette>

The printing cassette 10 illustrated in FIG. 2A is attachable to and detachable from the printing device body 100. Replacement of the printing cassette 10 enables to replenish the printing medium (that is, the printing tape 11A) and change the type of printing medium (for example, the size, color, and material, etc.).

The printing cassette 10 includes the printing tape cassette 30 and the auxiliary tape cassette 40. The printing cassette 10 is attachable to the printing device body 100 in a state where the printing tape cassette 30 and the auxiliary tape cassette 40 are connected to each other.

(Printing Tape Cassette)

Figure 2B:
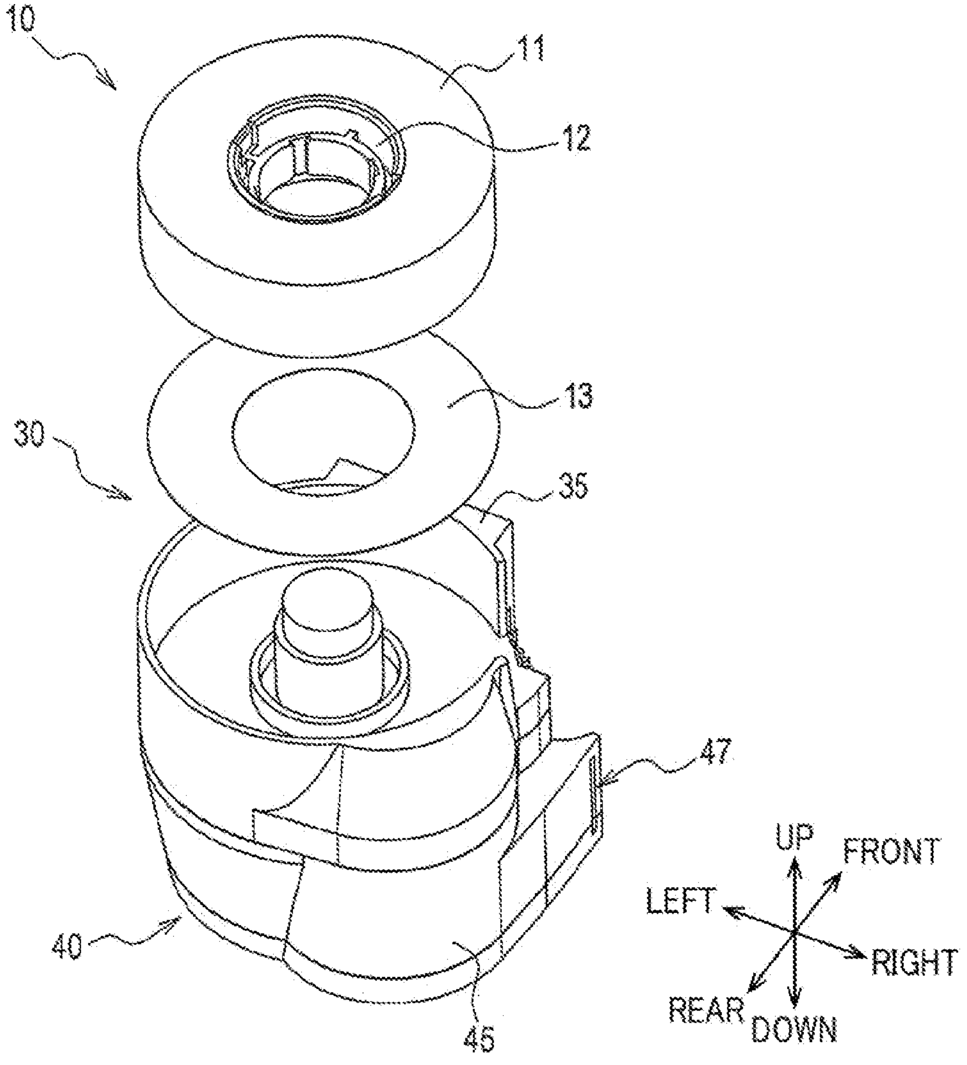
FIG. 2B is a schematic exploded perspective view of the printing cassette of FIG. 2A.
Figures 4A, 4B, 4C:
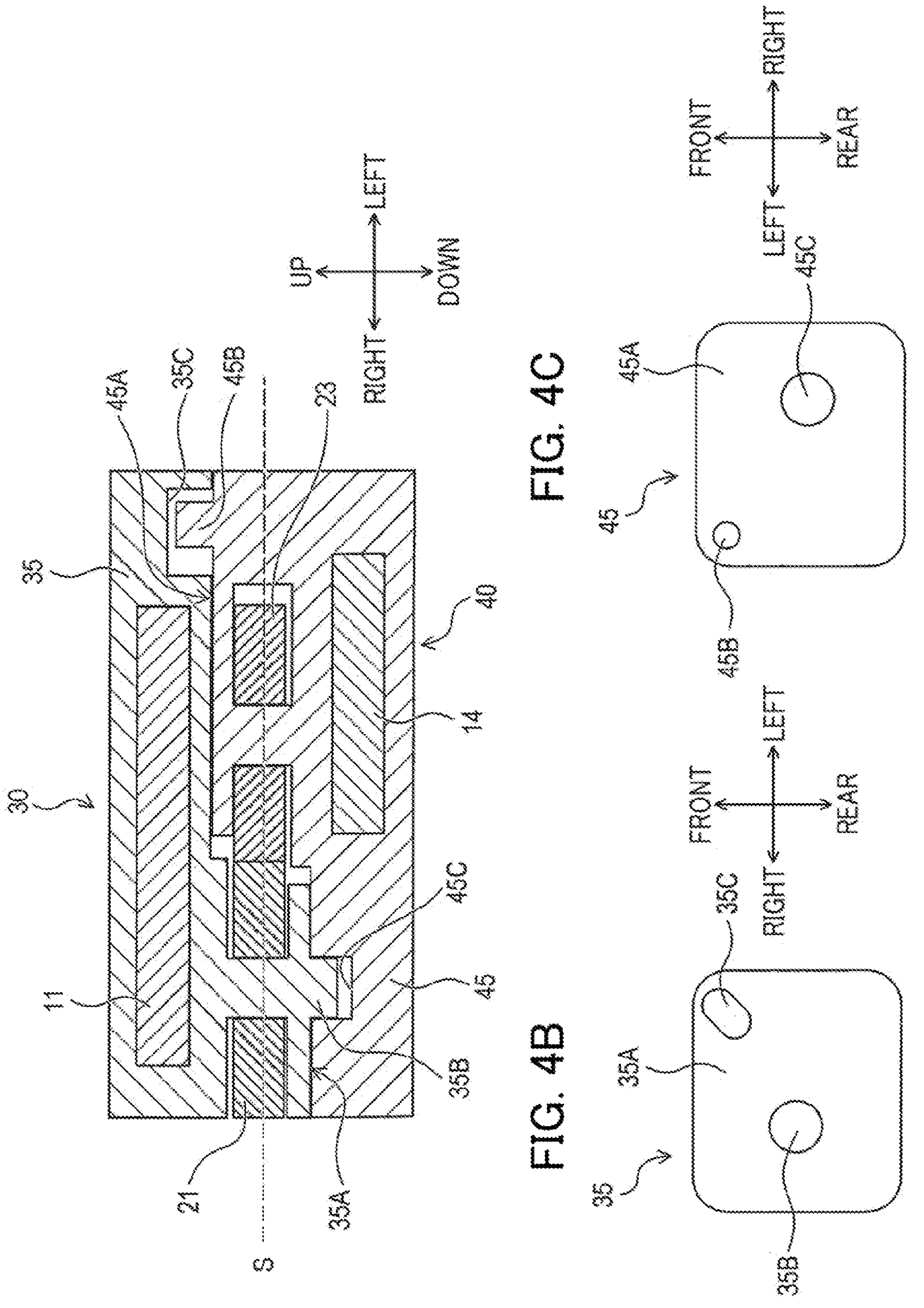
FIG. 4A is a schematic cross-sectional view of the printing cassette of FIG. 2A.
FIG. 4B is a schematic rear view of a printing tape cassette of FIG. 2A.
FIG. 4C is a schematic plan view of an auxiliary tape cassette of FIG. 2A.

As illustrated in FIGS. 2B and 4A, the printing tape cassette 30 includes a printing tape roll 11, a first supply spool 12, a spacer film 13, a first rotation transmission member 21 (as an example of a printing-tape-cassette rotation transmission member), and a printing tape case 35 (as an example of a first case).

(Printing Tape Roll)

The printing tape roll 11 is configured of the printing tape 11A wound around the first supply spool 12. Printing is performed on the printing tape 11A.

Printing is performed on a surface of the printing tape 11A by the printing head 102 of the printing device body 100 and an ink ribbon 14A (as an example of an auxiliary tape). The spacer film 13 is interposed between the printing tape roll 11 and the printing tape case 35.

(First Supply Spool)

The first supply spool 12 is rotatable about a rotation axis that is parallel to the up-down direction. The first supply spool 12 supplies the printing tape 11A to the printing head 102 by rotating as the platen roller 103 of the printing device body 100 conveys the printing tape 11A. The rotation axis of the first supply spool 12 and the winding axis of the printing tape roll 11 are the same axis.

(First Rotation Transmission Member)

As illustrated in FIG. 3, the first rotation transmission member 21 is a gear connectable to a second rotation transmission member 23 of the auxiliary tape cassette 40 in a state where the printing tape cassette 30 is attached to the printing device body 100 together with the auxiliary tape cassette 40.

The rotation axis of the first rotation transmission member 21 is parallel to the up-down direction. In the present embodiment, the first rotation transmission member 21 has a portion exposed to the outside of the printing tape case 35.

In a state where the printing cassette 10 is attached to the printing device body 100 (that is, in a state where the printing tape case 35 is accommodated in the cassette accommodating portion 101), the first rotation transmission member 21 is engaged with the platen gear 104 of the printing device body 100. That is, the first rotation transmission member 21 according to the present embodiment is an output gear provided for externally outputting the driving force to be used for conveying the printing tape 11A.

The first rotation transmission member 21 connects the platen gear 104 and the second rotation transmission member 23 to transmit to the platen roller 103 the driving force inputted into the input gear 22 from the drive shaft 105 of the printing device body 100.

Incidentally, the printing tape cassette 30 may further include a linking gear that engages both the first rotation transmission member 21 and the platen gear 104. That is, the first rotation transmission member 21 may be drive-connected indirectly to the platen gear 104.

(Printing Tape Case)

The printing tape case 35 accommodates therein at least a part of the first rotation transmission member 21 and at least a part of the printing tape 11A. As illustrated in FIGS. 4A and 4B, the printing tape case 35 has a first connecting surface 35A, a first protruding portion 35B, and a first recessed portion 35C.

The first connecting surface 35A is a surface that faces the auxiliary tape cassette 40. The first connecting surface 35A is perpendicular to the up-down direction. The first protruding portion 35B is a pin-like portion protruding from the first connecting surface 35A toward the auxiliary tape cassette 40 in the axial direction of the first rotation transmission member 21 (that is, in the up-down direction). The first protruding portion 35B rotatably supports the first rotation transmission member 21. The first recessed portion 35C is a portion of the first connecting surface 35A that is recessed upward.

The printing tape case 35 is connected to an auxiliary tape case 45 by insertion of the first protruding portion 35B in a second recessed portion 45C of the auxiliary tape case 45 and insertion of a second protruding portion 45B of the auxiliary tape case 45 in the first recessed portion 35C. That is, the first protruding portion 35B and the first recessed portion 35C are each an engaging portion that engages the auxiliary tape cassette 40.

The first recessed portion 35C is an elongated groove in a plan view whose longitudinal direction crosses both the front-rear direction and the left-right direction. The first recessed portion 35C restricts the second protruding portion 45B inserted in the first recessed portion 35C from moving in a direction perpendicular to the longitudinal direction. That is, the first recessed portion 35C functions as a rotation restriction portion restricting the printing tape cassette 30 from rotating relative to the auxiliary tape cassette 40.

In the interior of the printing tape case 35, the first rotation transmission member 21 is positioned closer to the first connecting surface 35A than the printing tape roll 11 is to the first connecting surface 35A. That is, the first rotation transmission member 21 is positioned below the printing tape roll 11.

As illustrated in FIG. 2A, the printing tape case 35 has a side surface, and a part of the side surface guides the printing tape 11A discharged from the printing tape case 35 toward the auxiliary tape case 45. The printing tape 11A is helically conveyed along the outer peripheral surface of the printing tape case 35. However, the printing tape 11A may be conveyed toward the auxiliary tape case 45 in the interior of the printing tape case 35.

(Auxiliary Tape Cassette 40)

Figure 5A:
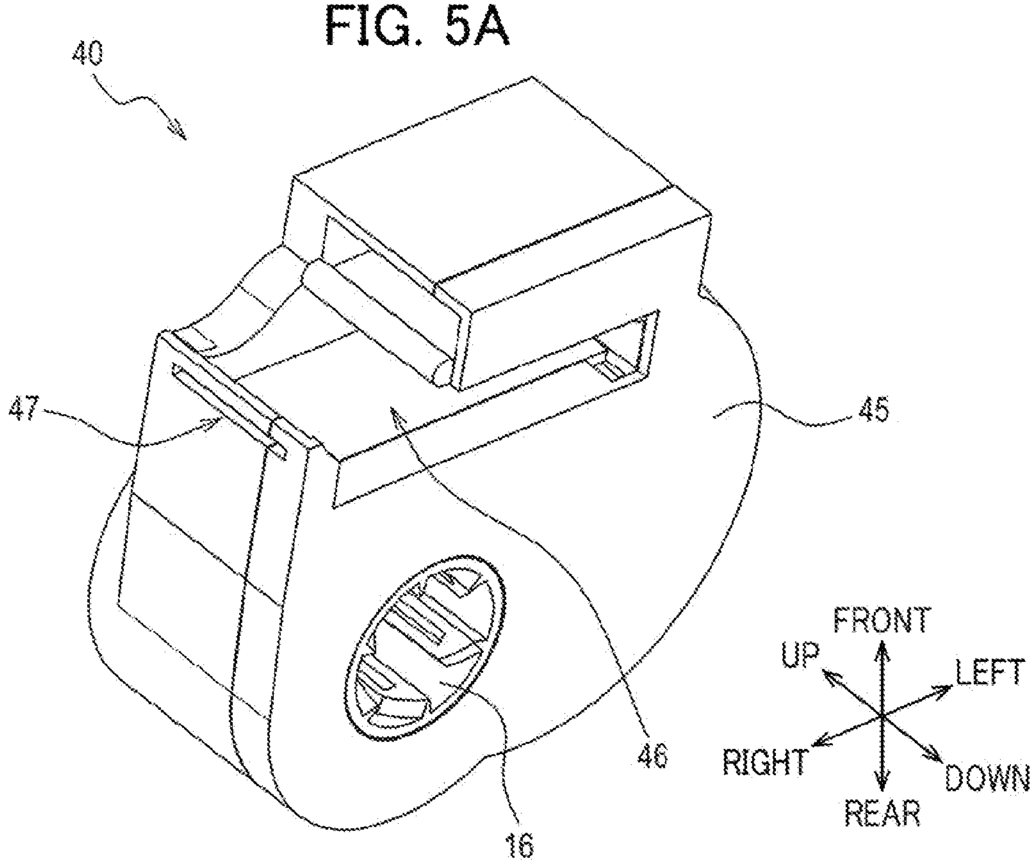
FIG. 5A is a schematic perspective view of the auxiliary tape cassette of FIG. 2A.
Figure 5B:
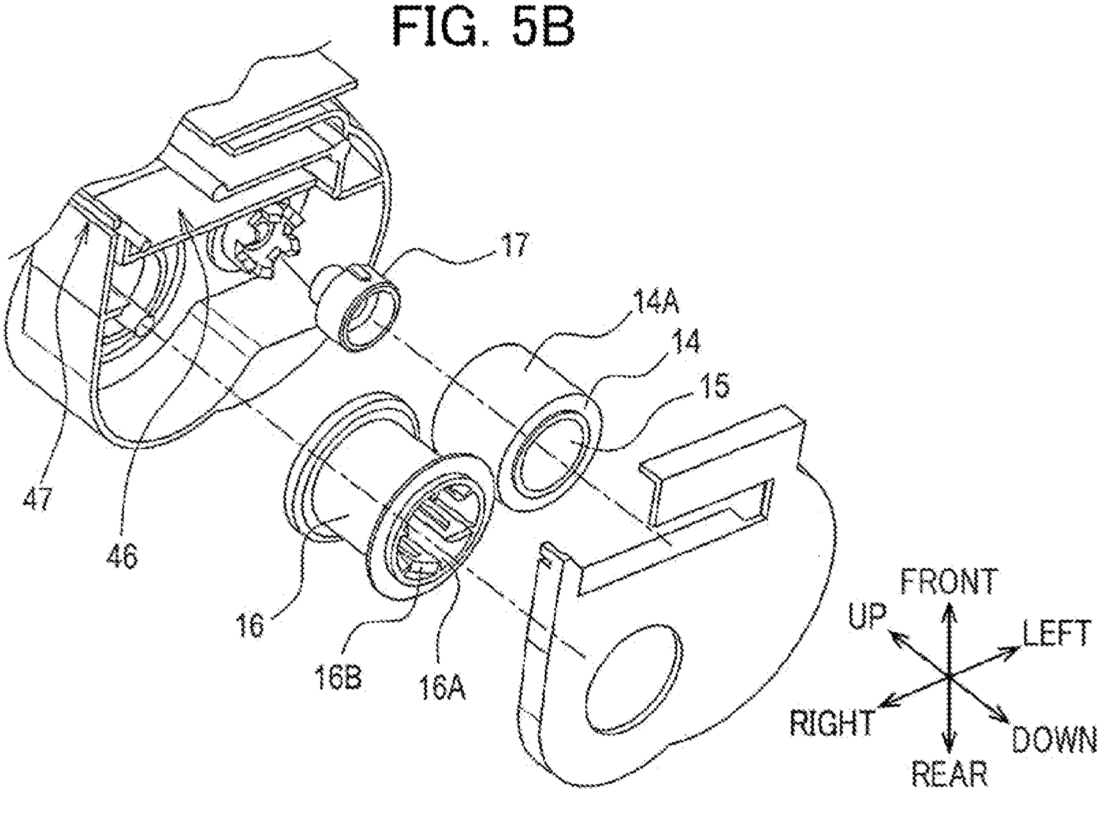
FIG. 5B is a schematic exploded perspective view of the auxiliary tape cassette of FIG. 5A.

The auxiliary tape cassette 40 illustrated in FIGS. 5A and 5B is attachable to and detachable from the printing tape cassette 30.

The auxiliary tape cassette 40 includes an ink ribbon roll 14 (as an example of an auxiliary tape roll), a second supply spool 15, the take-up spool 16, a clutch spring holder 17, the input gear 22 (see FIG. 3), the second rotation transmission member 23 (as an example of an auxiliary-tape-cassette rotation transmission member, see FIG. 3), and the auxiliary tape case 45 (as an example of a second case).

(Ink Ribbon Roll)

The ink ribbon roll 14 is configured of the ink ribbon 14A wound around the second supply spool 15. The ink ribbon 14A is used for printing on the printing tape 11A.

The ink ribbon 14A is overlaid on the printing tape 11A being conveyed in the head opening 46, and is used for printing by the printing head 102. The ink ribbon roll 14 that has been used for printing is taken up on the take-up spool 16.

Rotational resistance is applied to the ink ribbon roll 14 by a clutch spring (not shown) held by the clutch spring holder 17. At least a portion of the ink ribbon roll 14 is disposed in a position overlapping the printing tape roll 11 in the up-down direction.

(Second Supply Spool)

The second supply spool 15 is rotatable about a rotation axis that is parallel to the up-down direction. The rotation axis of the second supply spool 15 and the winding axis of the ink ribbon roll 14 are the same axis. The second supply spool 15 supplies the ink ribbon 14A to the head opening 46 by rotating as the take-up spool 16 takes up the ink ribbon roll 14.

(Take-Up Spool)

The take-up spool 16 is rotatable about a rotation axis that is parallel to the up-down direction. The take-up spool 16 has a cylindrical shape having an inner peripheral surface 16A. The take-up spool 16 has a hollow part defined by the inner peripheral surface 16A. The inner peripheral surface 16A of the take-up spool 16 is provided with splines 16B.

The drive shaft 105 of the printing device body 100 is connectable to the splines 16B. The take-up spool 16 is rotated by the drive shaft 105 to take up the ink ribbon 14A that has been used for printing.

(Input Gear)

As illustrated in FIG. 3, the input gear 22 indirectly engages the first rotation transmission member 21 through the second rotation transmission member 23 to transmit the driving force to the first rotation transmission member 21.

The input gear 22 has a rotation axis that is parallel to the up-down direction. The input gear 22 is engaged with the drive shaft 105 in a state where the auxiliary tape cassette 40 is attached to the printing device body 100. The input gear 22 is rotated by the drive shaft 105.

(Second Rotation Transmission Member)

The second rotation transmission member 23 is connected to the input gear 22. The second rotation transmission member 23 is connected to the first rotation transmission member 21 of the printing tape cassette 30 in a state where the printing cassette 10 is attached to the printing device body 100.

The second rotation transmission member 23 connects the input gear 22 and the first rotation transmission member 21 to transmit to the first rotation transmission member 21 the driving force inputted into the input gear 22 from the printing device body 100.

The input gear 22, the second rotation transmission member 23, and the first rotation transmission member 21 constitute a transmission path along which the driving force inputted from the drive shaft 105 of the printing device body 100 is transmitted to the platen roller 103 of the printing device body 100.

Incidentally, the printing tape cassette 30 may further include a linking gear that engages both the second rotation transmission member 23 and the input gear 22. That is, the second rotation transmission member 23 may be drive-connected indirectly to the input gear 22. Further, the second rotation transmission member 23 may directly engage the drive shaft 105.

(Auxiliary Tape Case)

The auxiliary tape case 45 accommodates therein at least a part of the second rotation transmission member 23 and at least a part of the ink ribbon 14A. As illustrated in FIGS. 4A and 4C, the auxiliary tape case 45 has a second connecting surface 45A, the second protruding portion 45B, and the second recessed portion 45C.

The second connecting surface 45A is a surface that faces the printing tape cassette 30. The second connecting surface 45A is perpendicular to the up-down direction. The second protruding portion 45B is a pin-like portion protruding from the second connecting surface 45A toward the printing tape cassette 30 in the axial direction of the second rotation transmission member 23 (that is, in the up-down direction). The second recessed portion 45C is a portion of the second connecting surface 45A that is recessed downward.

The second protruding portion 45B is insertable in the first recessed portion 35C of the printing tape case 35. The first protruding portion 35B of the printing tape case 35 is insertable in the second recessed portion 45C. The second protruding portion 45B and the second recessed portion 45C are each an engaging portion that engages the printing tape cassette 30.

The second recessed portion 45C has a circular shape in a plan view that is approximately identical to the plan-view shape of the second protruding portion 45B. The second recessed portion 45C functions as a positioning portion for fixing the position of the printing tape cassette 30 relative to the auxiliary tape cassette 40. A distance from the center in the left-right direction of the second recessed portion 45C to the rotation axis of the second rotation transmission member 23 is equal to a distance between the axis of the first rotation transmission member 21 and the axis of the second rotation transmission member 23.

In the interior of the auxiliary tape case 45, the second rotation transmission member 23 is positioned closer to the second connecting surface 45A than the ink ribbon roll 14 is to the second connecting surface 45A. That is, the second rotation transmission member 23 is positioned above the ink ribbon roll 14.

In a state where the printing tape cassette 30 is attached to the printing device body 100 together with the auxiliary tape cassette 40, there exists an imaginary plane S perpendicular to the up-down direction (that is, parallel to both the front-rear direction and the left-right direction) and passing through the first rotation transmission member 21 and the second rotation transmission member 23. The first rotation transmission member 21 and the second rotation transmission member 23 are disposed at positions overlapping each other in a radial direction of the first rotation transmission member 21 (that is, in the front-rear direction or in the left-right direction).

As illustrated in FIG. 5A, the auxiliary tape cassette 40 further has the head opening 46 and a discharge opening 47.

The head opening 46 is a space in which the printing head 102 is disposed in a state where the printing cassette 10 is attached to the printing device body 100. Printing on the printing tape 11A is performed by the printing head 102 in the head opening 46. The head opening 46 is open in the bottom of the auxiliary tape cassette 40 so that the printing head 102 can be inserted into the head opening 46 from below.

The printing tape 11A and the ink ribbon 14A are bridged over the head opening 46 in the left-right direction. The printing tape 11A is exposed to an outside through the head opening 46 at a position upstream of the discharge opening 47 in the discharging direction in which the printing tape 11A is discharged.

The discharge opening 47 is an opening for discharging the printing tape 11A on which printing has been performed to the outside of the printing cassette 10. That is, the discharge opening 47 is an opening for discharging the printing tape 11A from the interior of the auxiliary tape case 45 to the outside thereof. The printing tape 11A after printing has been performed is discharged from the printing device to the outside thereof through the discharge opening 47.

<Conveying Printing Tape and Printing on Printing Tape by Printing Device Body>

In a state where the printing cassette 10 is attached to the printing device body 100, the printing head 102 is positioned within the head opening 46 at a position overlapping the printing tape 11A and the ink ribbon 14A in the front-rear direction.

The platen roller 103 conveys the printing tape 11A into the head opening 46 and presses the printing tape 11A against the printing head 102, whose heating elements have been heated, through the ink ribbon 14A. As a result, some ink provided on the surface of the ink ribbon 14A is transferred onto the printing tape 11A to print characters, symbols, and the like on the printing tape 11A.

The platen roller 103 conveys the printed printing tape 11A from the interior of the printing cassette 10 toward the outside of the printing cassette 10. The platen roller 103 is rotated by the platen gear 104 engaged with the first rotation transmission member 21.

In a state where the printing cassette 10 is inserted in the cassette accommodating portion 101, the drive shaft 105 is engaged with the input gear 22, and the platen gear 104 is engaged with the first rotation transmission member 21.

The first rotation transmission member 21 is rotated by the input gear 22 being rotated by the drive shaft 105 in the attached state of the printing cassette 10. Further, the rotation of the first rotation transmission member 21 rotates the platen gear 104, and the rotation of the platen gear 104 rotates the platen roller 103.

Modifications to First Embodiment

In the above-described embodiment, the layout and functions of the first rotation transmission member 21 and second rotation transmission member 23 can be suitably modified.

As illustrated in FIG. 6A, the auxiliary tape cassette 40 may include an upstream side second rotation transmission member 231 and a downstream side second rotation transmission member 232. The upstream side second rotation transmission member 231 functions as an input gear into which a driving force is inputted from the drive shaft 105. The downstream side second rotation transmission member 232 functions as an output gear that outputs the driving force to the platen gear 104.

In FIG. 6A, the printing tape cassette 30 includes a first rotation transmission member 21A connectable to both the upstream side second rotation transmission member 231 and the downstream side second rotation transmission member 232. The first rotation transmission member 21A transmits the driving force from the upstream side second rotation transmission member 231 to the downstream side second rotation transmission member 232.

As illustrated in FIG. 6B, the auxiliary tape cassette 40 may include a second rotation transmission member 23B and an output gear 24. The output gear 24 outputs a driving force to the platen gear 104. The second rotation transmission member 23B is drive-connected to the output gear 24.

In FIG. 6B, the printing tape cassette 30 includes a first rotation transmission member 21B connectable to the second rotation transmission member 23B. The first rotation transmission member 21B functions as an input gear into which a driving force is inputted from the drive shaft 105.

As illustrated in FIG. 6C, the printing tape cassette 30 may include an upstream side first rotation transmission member 211 and a downstream side first rotation transmission member 212. The upstream side first rotation transmission member 211 functions as an input gear into which a driving force is inputted from the drive shaft 105. The downstream side first rotation transmission member 212 functions as an output gear that outputs the driving force to the platen gear 104.

In FIG. 6C, the auxiliary tape cassette 40 includes a second rotation transmission member 23C connectable to both the upstream side first rotation transmission member 211 and the downstream side first rotation transmission member 212. The second rotation transmission member 23C transmits the driving force from the upstream side first rotation transmission member 211 to the downstream side first rotation transmission member 212.

Incidentally, in the embodiments illustrated in FIGS. 6A through 6C, additional gears may be interposed between the drive shaft 105 and the first rotation transmission member functioning as the input gear or between the drive shaft 105 and the second rotation transmission member functioning as the input gear, and additional gears may also be interposed between the platen gear 104 and the first rotation transmission member functioning as the output gear or between the platen gear 104 and the second rotation transmission member functioning as the output gear.

1-2. Effect

The following effects are obtained in the first embodiment and its modifications.

(1a) Arbitrary combinations of the ink ribbon 14A and the printing tape 11A can be obtained by respectively selecting the auxiliary tape cassette 40 and the printing tape cassette 30.

(1b) Since the rotation transmission member is provided in each of the auxiliary tape cassette 40 and the printing tape cassette 30 for transmitting the driving force from the printing device body 100, power transmissions suitable for conveying the ink ribbon 14A and the printing tape 11A can be realized.

(1c) Since the first rotation transmission member 21 is disposed closer to the first connecting surface 35A than the printing tape roll 11 is to the first connecting surface 35A, engagement of the first rotation transmission member 21 with the second rotation transmission member 23 can be easily made. Similarly, since the second rotation transmission member 23 is disposed closer to the second connecting surface 45A than the ink ribbon roll 14 is to the second connecting surface 45A, engagement of the second rotation transmission member 23 with the first rotation transmission member 21 can be easily made.

(1d) Since there exists the imaginary plane S passing through the first rotation transmission member 21 and the second rotation transmission member 23, the printing cassette 10 resulting from the connection between the auxiliary tape cassette 40 and the printing tape cassette 30 can have a reduced dimension in the up-down direction.

(1e) Since the auxiliary tape case 45 and the printing tape case 35 each include the engaging portions, displacement between the auxiliary tape cassette 40 and the printing tape cassette 30 can be suppressed. Further, since the distance between the engaging portion of the auxiliary tape case 45 and the engaging portion of the printing tape case 35 defines the distance between the axis of the first rotation transmission member 21 and the axis of the second rotation transmission member 23, enhanced connection accuracy between the first rotation transmission member 21 and the second rotation transmission member 23 can be obtained.

2. SECOND EMBODIMENT 2-1. Structure

Instead of the printing cassette 10 according to the first embodiment, a printing cassette 210 illustrated in FIG. 7A is attachable to the printing device body 100.

The printing cassette 210 includes a printing tape cassette 30, an auxiliary tape cassette 40, and a gear cassette 50. The printing tape cassette 30 and the auxiliary tape cassette 40 are similar to those in the first embodiment.

(Gear Cassette)

The gear cassette 50 is disposed between the printing tape cassette 30 and the auxiliary tape cassette 40. The gear cassette 50 is attachable to and detachable from the printing tape cassette 30. Also, the gear cassette 50 is attachable to and detachable from the auxiliary tape cassette 40.

The gear cassette 50 includes a third rotation transmission member 223A (as an example of a rotation transmission member for being connected), and a gear case 55.

The third rotation transmission member 223A is connectable to a second rotation transmission member 222A (as an example of a rotation transmission member for connection) of the auxiliary tape cassette 40. Further, the third rotation transmission member 223A functions as an input gear into which a driving force is inputted from the drive shaft 105. In this embodiment, the third rotation transmission member 223A is provided outside both of the printing tape case 35 and the auxiliary tape case 45.

The second rotation transmission member 222A (as the example of the rotation transmission member for connection) of the auxiliary tape cassette 40 is connectable to both the third rotation transmission member 223A and a first rotation transmission member 221A of the printing tape cassette 30.

The first rotation transmission member 221A and the second rotation transmission member 222A correspond to the downstream side first rotation transmission member 212 and the second rotation transmission member 23C illustrated in FIG. 6C, respectively. The third rotation transmission member 223A is provided in place of the upstream side first rotation transmission member 211 illustrated in FIG. 6C.

Modifications to Second Embodiment

In the second embodiment, the layout and functions of the first rotation transmission member 221A, the second rotation transmission member 222A, and the third rotation transmission member 223A may be suitably modified.

A first rotation transmission member 221B and a second rotation transmission member 222B illustrated in FIG. 7B correspond to the first rotation transmission member 21 and the input gear 22 illustrated in FIG. 3, respectively. A third rotation transmission member 223B illustrated in FIG. 7B is provided in place of the second rotation transmission member 23 illustrated in FIG. 3.

In FIG. 7B, the first rotation transmission member 221B and the second rotation transmission member 222B are both connectable to the third rotation transmission member 223B. That is, in FIG. 7B, two rotation transmission members for connection are provided.

A first rotation transmission member 221C and a second rotation transmission member 222C illustrated in FIG. 8A correspond to the first rotation transmission member 21A and the downstream side second rotation transmission member 232 illustrated in FIG. 6A, respectively. A third rotation transmission member 223C illustrated in FIG. 8A is provided in place of the upstream side second rotation transmission member 231 illustrated in FIG. 6A.

A first rotation transmission member 221D and a second rotation transmission member 222D illustrated in FIG. 8B correspond to the first rotation transmission member 21A and the upstream side second rotation transmission member 231 illustrated in FIG. 6A, respectively. A third rotation transmission member 223D illustrated in FIG. 8B is provided in place of the downstream side second rotation transmission member 232 illustrated in FIG. 6A.

A first rotation transmission member 221E and a second rotation transmission member 222E illustrated in FIG. 9A correspond to the upstream side first rotation transmission member 211 and the second rotation transmission member 23C illustrated in FIG. 6C, respectively. A third rotation transmission member 223E illustrated in FIG. 9A is provided in place of the downstream side first rotation transmission member 212 illustrated in FIG. 6C.

A first rotation transmission member 221F and a second rotation transmission member 222F illustrated in FIG. 9B correspond to the first rotation transmission member 21B and the output gear 24 illustrated in FIG. 6B, respectively. A third rotation transmission member 223F illustrated in FIG. 9B is provided in place of the second rotation transmission member 23B illustrated in FIG. 6B.

Further, the rotation transmission member for connection that is connectable to the rotation transmission member for being connected that is provided in the gear cassette 50 may be disposed in only one of the printing tape cassette 30 and the auxiliary tape cassette 40.

Figure 10A:
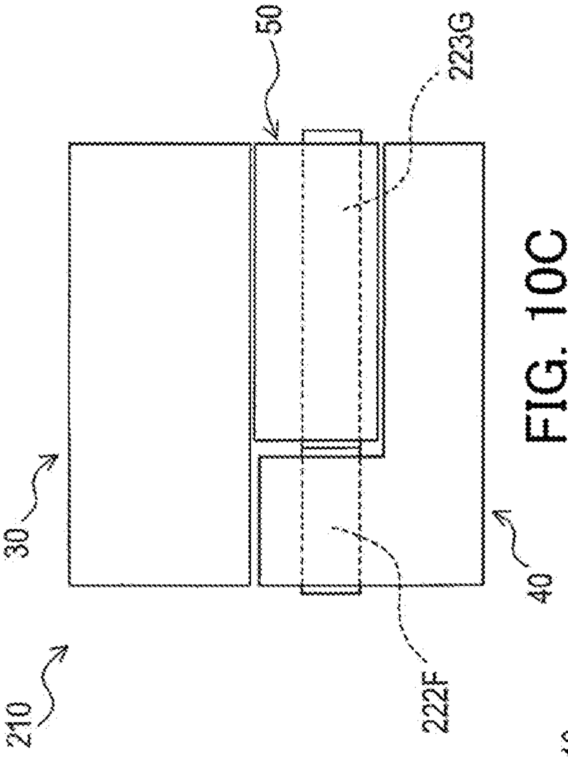

A printing tape cassette 30 illustrated in FIG. 10A does not include the first rotation transmission member. A third rotation transmission member 223G illustrated in FIG. 10A incorporates the functions of the first rotation transmission member 221F illustrated in FIG. 9B. The third rotation transmission member 223G is connectable to the second rotation transmission member 222F similar to that in FIG. 9B.

Figure 10B:
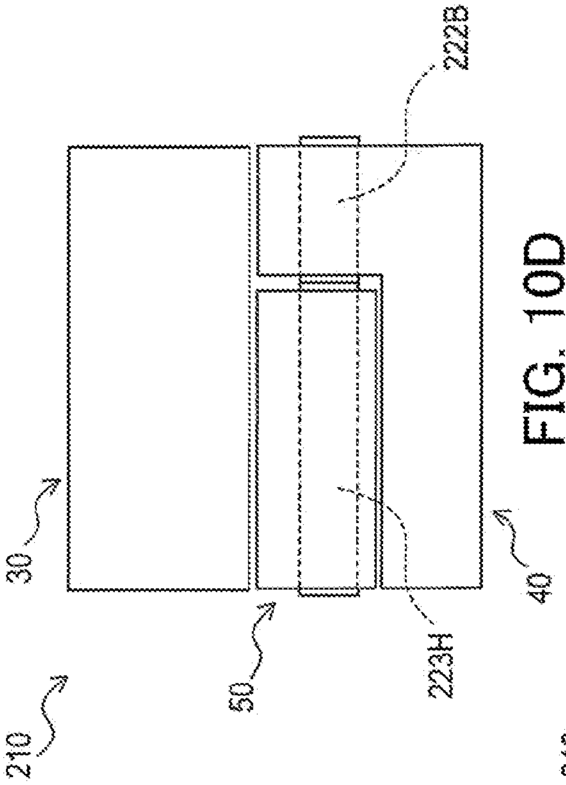

Also, a printing tape cassette 30 illustrated in FIG. 10B does not include the first rotation transmission member. A third rotation transmission member 223H illustrated in FIG. 10B incorporates the functions of the first rotation transmission member 221B illustrated in FIG. 7B. The third rotation transmission member 223H is connectable to the second rotation transmission member 222B similar to that in FIG. 7B.

Figure 10C:
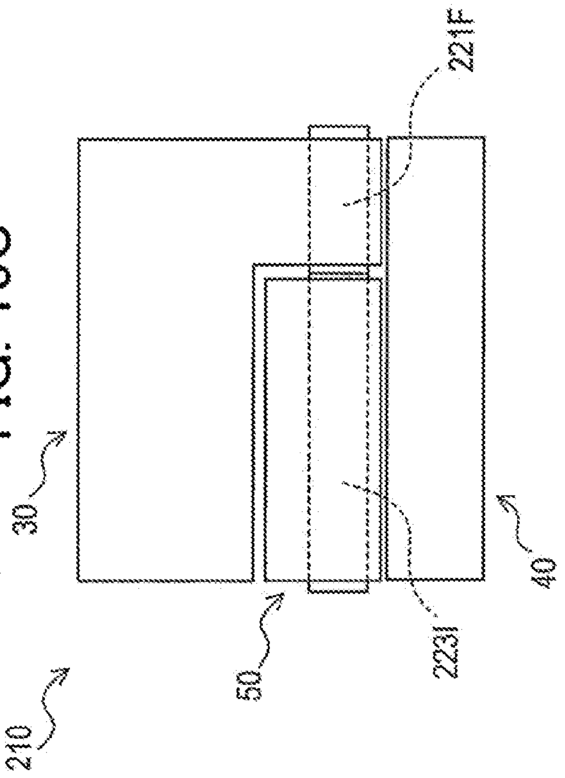

An auxiliary tape cassette 40 illustrated in FIG. 10C does not include the second rotation transmission member. A third rotation transmission member 2231 illustrated in FIG. 10C incorporates the functions of the second rotation transmission member 222F illustrated in FIG. 9B. The third rotation transmission member 2231 is connectable to the first rotation transmission member 221F similar to that in FIG. 9B.

Figure 10D:
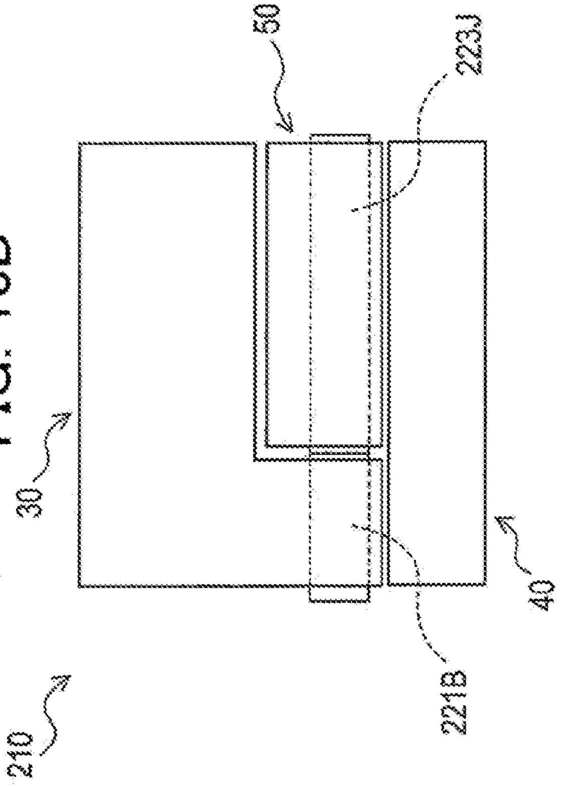

Also, an auxiliary tape cassette 40 illustrated in FIG. 10D does not include the second rotation transmission member. A third rotation transmission member 223J illustrated in FIG. 10D incorporates the functions of the second rotation transmission member 222B illustrated in FIG. 7B. The third rotation transmission member 223J is connectable to the first rotation transmission member 221B similar to that in FIG. 7B.

2-2. Effect

The following effect is obtained in the second embodiment and its modifications.

(2a) Power transmission suitable for conveying the ink ribbon 14A and the printing tape 11A can be more adequately realized by replacement of the gear cassette 50.

3. OTHER EMBODIMENTS

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

(3a) The printing devices according to the above-described embodiments are not limited to a configuration in which an ink ribbon is used for printing. The printing devices may use a strip of heat sensitive paper in place of the printing tape. In this case, a laminate tape may be used as the auxiliary tape.

(3b) In the printing cassettes according to the above-described embodiments, the imaginary plane perpendicular to the up-down direction and passing through the first rotation transmission member and the second rotation transmission member need not necessarily exist. That is, the first rotation transmission member and the second rotation transmission member may be disposed at positions offset from each other in the up-down direction.

(3c) In the printing cassettes according to the above-described embodiments, the rotation transmission members are not limited to gears. That is, the rotation transmission members may be rotary bodies other than gears, such as rollers or belts.

(3d) Functions possessed by a single component in the embodiments described above may be distributed among a plurality of components, and functions possessed by a plurality of components may be integrated into a single component. Additionally, some of the structures in the embodiments described above may be omitted. Further, at least some of the structures in the embodiments may be added to or used in place of structures in other embodiments. All aspects included in the technical concepts identified from descriptions in the claims are embodiments of the present disclosure.

What is claimed is:

1. An auxiliary tape cassette attachable to a printing device body together with a printing tape cassette comprising a printing tape and a printing-tape-cassette gear, the auxiliary tape cassette comprising:

an auxiliary tape used for printing on the printing tape;

an auxiliary-tape-cassette gear connectable to the printing-tape-cassette gear of the printing tape cassette; and a case that accommodates therein at least a part of the auxiliary-tape-cassette gear and at least a part of the auxiliary tape.

2. The auxiliary tape cassette according to claim 1, wherein the auxiliary-tape-cassette gear is configured to transmit to the printing-tape-cassette gear a driving force inputted from the printing device body.

3. The auxiliary tape cassette according to claim 1, further comprising:

an auxiliary tape roll configured of the auxiliary tape, wherein the case has a connecting surface configured to face the printing tape cassette, and wherein the auxiliary-tape-cassette gear is positioned closer to the connecting surface than the auxiliary tape roll is to the connecting surface.

4. The auxiliary tape cassette according to claim 1, wherein, in a state where the auxiliary tape cassette is attached to the printing device body together with the printing tape cassette, there exists an imaginary plane perpendicular to an axial direction of the auxiliary-tape-cassette gear and passing through both the printing-tape-cassette gear and the auxiliary-tape-cassette gear.

5. The auxiliary tape cassette according to claim 1, wherein the case has an engaging portion configured to engage the printing tape cassette.

6. The auxiliary tape cassette according to claim 5, wherein the engaging portion is a protruding portion protruding in an axial direction of the auxiliary-tape-cassette gear or a recessed portion recessed in the axial direction.

7. A printing tape cassette attachable to a printing device body together with an auxiliary tape cassette comprising an auxiliary tape used for printing on a printing tape and an auxiliary-tape-cassette gear, the auxiliary-tape-cassette gear being rotatable, the printing tape cassette comprising:

the printing tape;

a printing-tape-cassette gear connectable to the auxiliary-tape-cassette gear of the auxiliary tape cassette; and a case that accommodates therein at least a part of the printing-tape-cassette gear and at least a part of the printing tape.

8. The printing tape cassette according to claim 7, further comprising:

a printing tape roll configured of the printing tape, wherein the case has a connecting surface configured to face the auxiliary tape cassette, and wherein the printing-tape-cassette gear is positioned closer to the connecting surface than the printing tape roll is to the connecting surface.

9. The printing tape cassette according to claim 7, wherein, in a state where the printing tape cassette is attached to the printing device body together with the auxiliary tape cassette, there exists an imaginary plane perpendicular to an axial direction of the printing-tape-cassette gear and passing through both the printing-tape-cassette gear and the auxiliary-tape-cassette gear.

10. The printing tape cassette according to claim 7, wherein the case has an engaging portion configured to engage the auxiliary tape cassette.

11. The printing tape cassette according to claim 10, wherein the engaging portion is a protruding portion protruding in an axial direction of the printing-tape-cassette gear or a recessed portion recessed in the axial direction.

12. A printing cassette comprising:

a printing tape cassette comprising a printing tape;

an auxiliary tape cassette attachable to a printing device body together with the printing tape cassette;

a first gear; and a second gear, wherein the printing tape cassette comprises:

a first case that accommodates therein at least a part of the printing tape, wherein the auxiliary tape cassette comprises:

an auxiliary tape used for printing on the printing tape; and a second case that accommodates therein at least a part of the auxiliary tape, wherein at least a part of the first gear is accommodated in at least one of the first case and the second case, and wherein the first gear is connectable to the second gear, the first gear being rotatable, the second gear being rotatable.

* * * * *